June 29, 1948.      R. W. DINZL      2,444,339
MOLDING MACHINE

Filed May 24, 1944      5 Sheets-Sheet 2

INVENTOR
Richard W. Dinzl
BY
Kenyon + Kenyon
ATTORNEYS

June 29, 1948. R. W. DINZL 2,444,339
MOLDING MACHINE
Filed May 24, 1944 5 Sheets-Sheet 3

INVENTOR
Richard W. Dinzl
BY
Kenyon & Kenyon
ATTORNEYS

June 29, 1948.  R. W. DINZL  2,444,339
MOLDING MACHINE
Filed May 24, 1944  5 Sheets-Sheet 5

INVENTOR
Richard W. Dinzl
BY
Kenyon & Kenyon
ATTORNEYS

Patented June 29, 1948

2,444,339

UNITED STATES PATENT OFFICE 2,444,339

MOLDING MACHINE

Richard W. Dinzl, Westfield, N. J., assignor to The Watson-Stillman Co., Roselle, N. J., a corporation of New Jersey Application May 24, 1944, Serial No. 537,077

16 Claims. (Cl. 18—16)

1

This invention relates to molding machines.

An object of this invention is the provision in an automatic molding machine of apparatus for checking the condition of the die members of the machine after completion of a molding cycle in combination with means for interrupting the operation of the machine in the event that either of the die members retain any residue of molding material which might interfere with the proper operation of the machine.

A molding machine embodying the invention includes a vertically movable ram carrying a die member for movement into and out of engagement with a stationary die member. The machine also is provided with a slide movable into and out of the path of the movable die member and is equipped with feeler means movable therein in the direction of travel of the movable die member. The feeler means are biased away from the stationary die member. Means are provided for causing the ram to descend under low pressure preferably less than its own weight, to engage the feeler means and depress the same into the die cavities. In the event that no residue has been left on or in the die members from the previous molding cycle, the ram descends a predetermined distance and operates the control means of the machine to cause the machine to run through a molding cycle. In the event that either of the molding members retains any residue, the ram is prevented from descending the predetermined extent whereupon operation of the machine is automatically interrupted and the machine remains in such condition until serviced by the operator.

Other objects, novel features and advantages of this invention will become apparent from the following specification and accompanying drawings, wherein.

Figure 1:
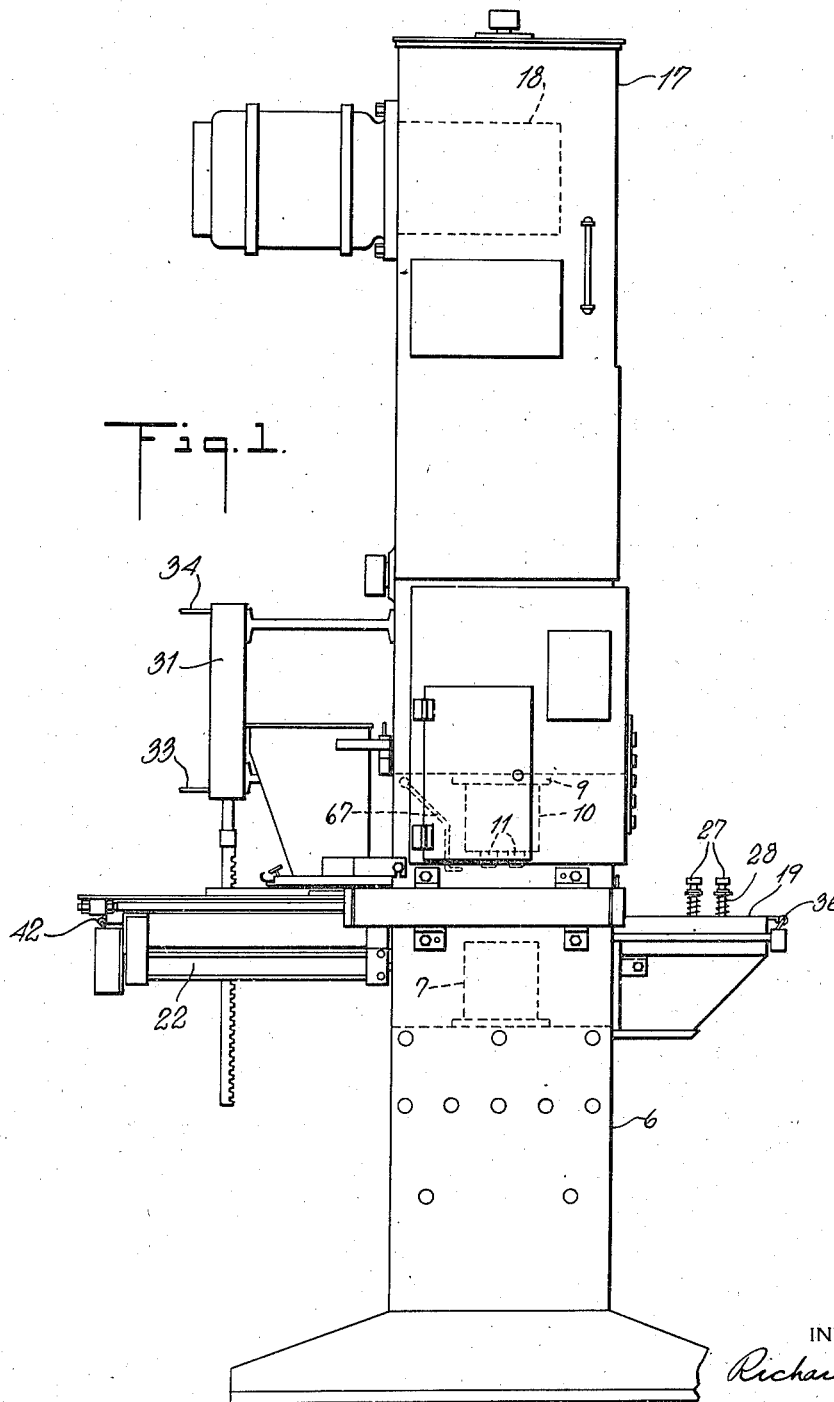
Fig. 1 is a side elevation of a machine embodying the invention.
Figure 2:
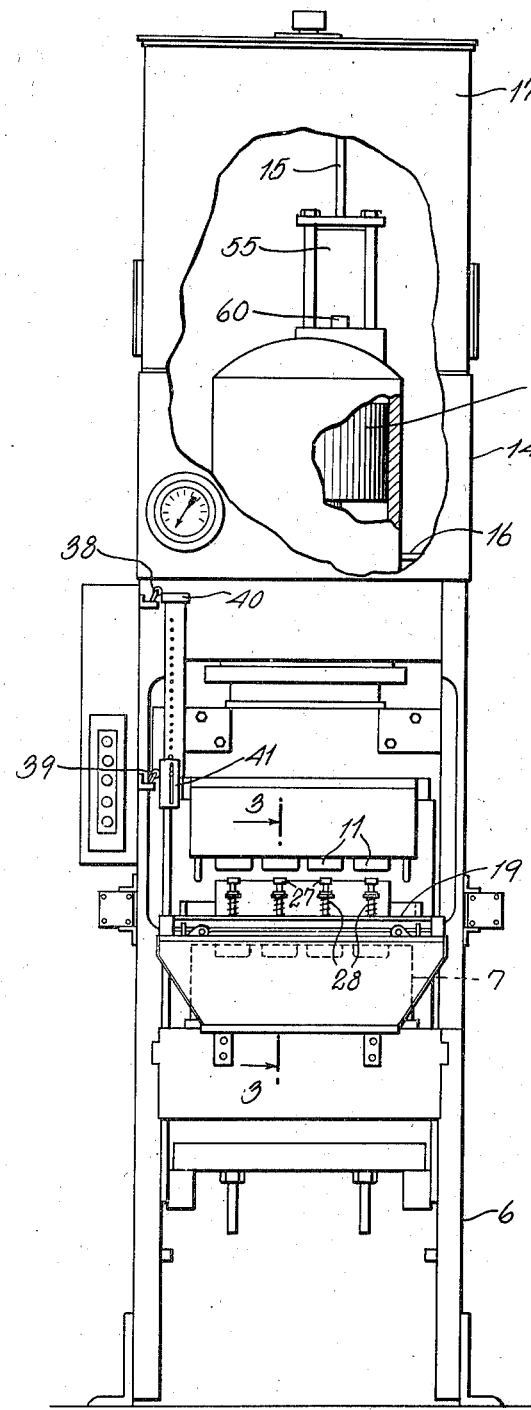
Fig. 2 is a front elevation.

In the frame 5 is provided a bed 6 on which is mounted a die block 7 having one or more recesses 8. A ram 9 is mounted in the frame 5 for movement toward and away from the bed

2

6 and carries a die block 10 having projections 11 suitably shaped to enter the recesses 8 and press into desired shape charges of thermoplastic material contained in the recesses.

The ram 9 terminates at its upper end in a piston 13 received within a cylinder 14 carried by the frame 5. The piston 13 is caused to reciprocate in the cylinder 14 by means of oil or other suitable liquid supplied to and removed from the cylinder through the conduits 15 and 16. The frame carries a tank 17 in which oil is contained and a motor-driven pump 18 is provided for supplying the oil under pressure. The tank 17 encloses the major portion of the cylinder 14 and a hydraulic system (Fig. 4) including the conduits 15 and 16 for supplying oil to and withdrawing oil from the cylinder 14 as well as electrically-operated means for controlling the flow of oil in the hydraulic system.

A slide 19 is mounted on horizontal guides for reciprocation into and out of the path of the ram 9. The slide 19 is attached by a rod 20 to a piston 21 arranged in a horizontal cylinder 22 vented at its left end. The right end of the cylinder 22 is connected to a three-way valve 23 having a port communicating through a conduit 24 with a source of compressed air and another port communicating with atmosphere. A spring 25 biases the valve 23 into the position in which the cylinder 22 is in communication with the atmosphere and there is provided a solenoid 26, which, when energized, operates the valve to disconnect the cylinder 22 from atmosphere and connect it to the conduit 24.

The slide 19 supports a multiplicity of vertically reciprocable feelers 27 which are biased upwardly by springs 28. The feelers 27 are for use in stopping the operation of the machine in the event that, after completion of a molding operation, a die cavity 8 or a projection 11 retains any thermoplastic material.

Figure 3:
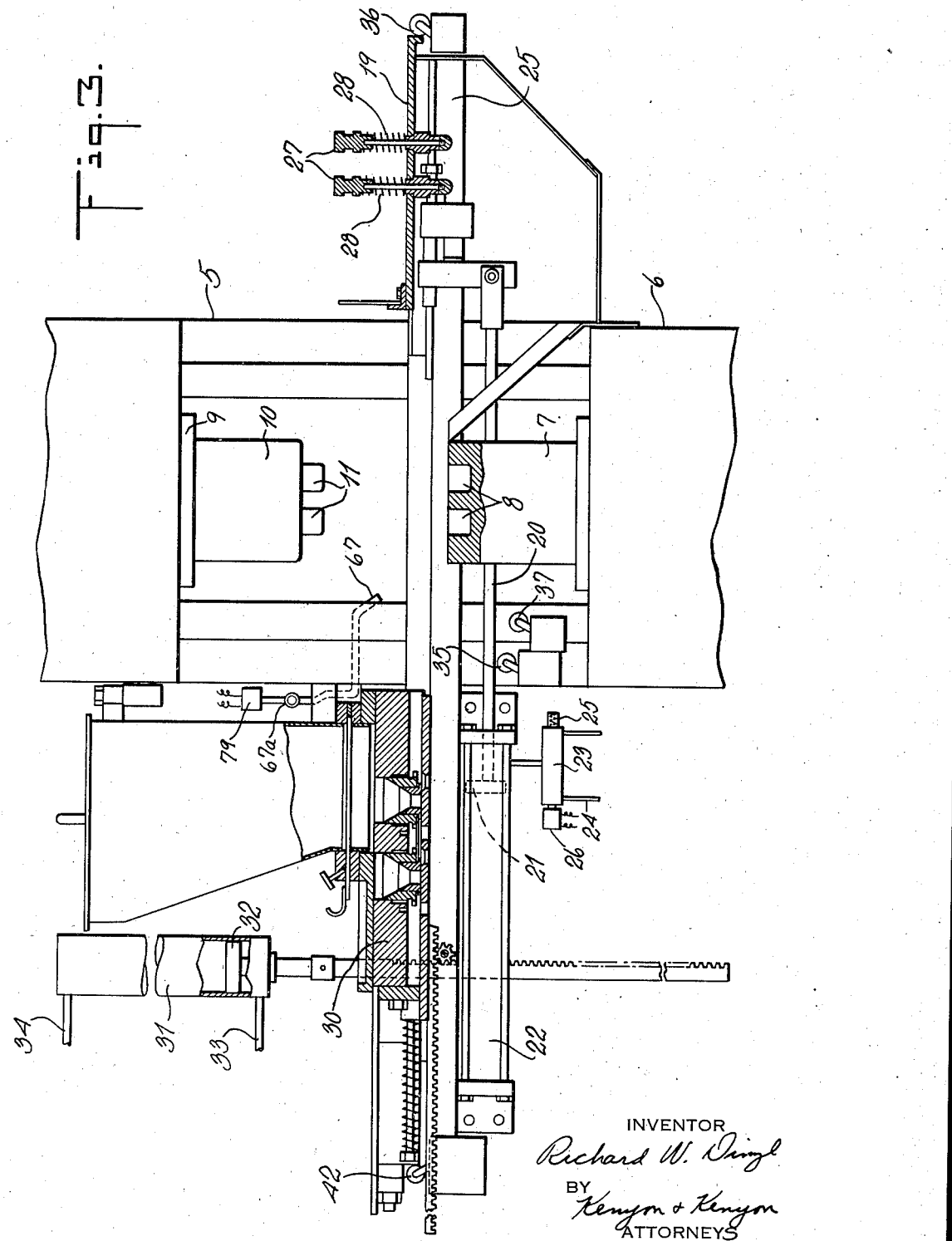
Fig. 3 is an enlarged section on the line 3—3 of Fig. 2.

In the operation of the press and with the ram 9 elevated after completion of a molding operation, the solenoid 26 is energized to operate the valve 23 to connect the cylinder 22 to the conduit 24, whereupon the slide 19 is moved from the position shown in Fig. 3 into a position in which the feelers 27 directly underlie the projections 11.

Then, by an arrangement subsequently to be described, the ram 9 is caused to move downwardly slowly by gravity. If the projections 11 are clean and there is no material in any recess 8, the ram descends to a predetermined extent, pushes the feelers 27 downwardly into the recesses 8 against the action of the springs 28. In the event that the ram moves downwardly the predetermined extent above mentioned, the control mechanism (subsequently to be described) is so affected that the feeler slide 19 is returned to its original position after the return of ram 9 to its top position and the machine follows through another molding cycle. However, in the event that because of some obstruction either on a projection 11 or in a recess 8, the ram 9 is prevented from descending the above-mentioned predetermined extent, then the control mechanism is affected in such a manner that operation of the machine is interrupted.

A feed slide 30 is arranged for reciprocation into and out of the path of the ram 9 by a hydraulic motor embodying a cylinder 31 and a piston 32 as shown and described in the U. S. patent to Farley, No. 2,256,081. Oil is supplied to and withdrawn from the hydraulic motor by conduits 33 and 34. The right end of the feed slide 30 is engaged by the left end of the feeler slide 19 on leftward movement of the latter to locate it properly under the ram. The feeler slide 19 is moved out of the path of the ram by rightward movement of the feed slide into the path of the ram 9, the valve 23 then being in position to put cylinder 22 in communication with atmosphere.

As part of the control mechanism, normally open or self-opening limit switches 35 and 36 are provided for co-operation with the slide 19 as well as a limit switch 37 having one pair of normally closed or self-closing contacts and another pair of normally open or self-opening contacts. Also, a normally open or self-opening limit switch 38 and a normally opening or self-opening limit switch 39 are provided for co-operation with actuating members 40 and 41 carried by the ram 9. In addition, a normally open or self-opening limit switch 42 is provided for co-operation with the slide 30.

Assume that the machine has completed a molding cycle and the ram is at the top of its stroke with the slide 19 in the position shown in Fig. 3. In this position, the limit switch 39 is open by reason of disengagement therefrom of the member 41 and the limit switch 38 is closed by the member 40 to complete a circuit to energize the solenoid 26 to operate the valve 23 to cause compressed air to be supplied to the right end of the cylinder 22 to effect leftward movement of the piston 21 to locate the slide 19 with the feelers 27 underlying the projections 11. Inward movement of the slide 19 causes operation of the limit switches 35, 36 and 37 to affect the control mechanism in such manner that the ram descends under very light pressure. On downward movement, the member 40 releases switch 38 which opens automatically and the member 41 releases or fails to release the limit switch 39 to closed condition depending upon whether the ram descends to a predetermined extent or fails to descend to said predetermined extent. If the ram descends to the predetermined extent so that the switch 39 is closed, the ram 9 is lifted and the solenoid 26 is de-energized thereby effecting operation of valve 23 in such manner that the left end of the cylinder 22 is opened to atmosphere. Thereupon, the feeder slide 30 is operated to charge the recesses 8 with molding material as described in said Farley Patent No. 2,256,081, after which the machine proceeds through a molding cycle. Should the ram fail to descend to the predetermined extent, the limit switch 39 is not closed and the operation of the machine is stopped. The machine will remain in its stopped condition until operation is re-established by the operator of the machine.

Figure 4:
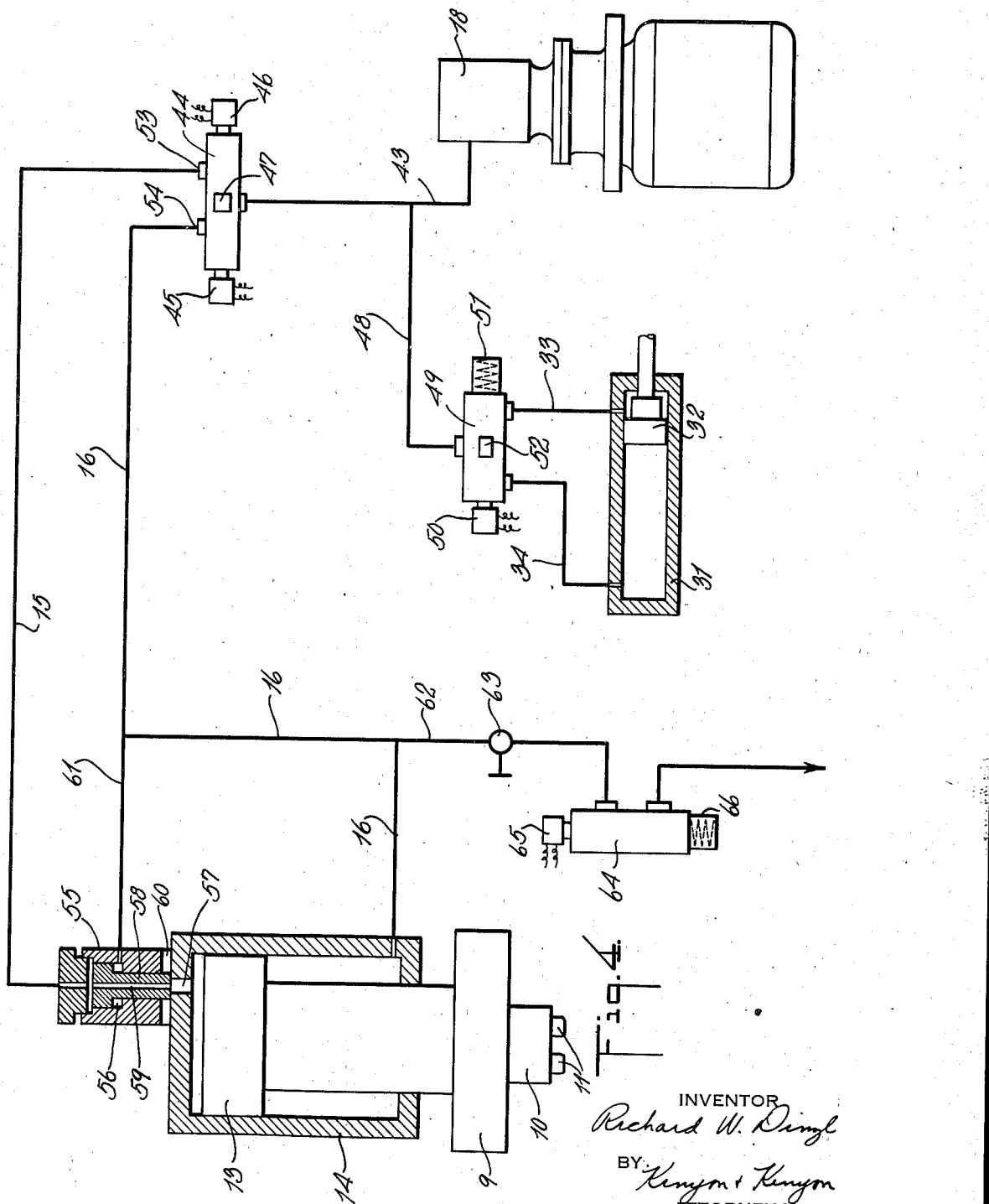
Fig. 4 is a hydraulic diagram.
Figure 5:
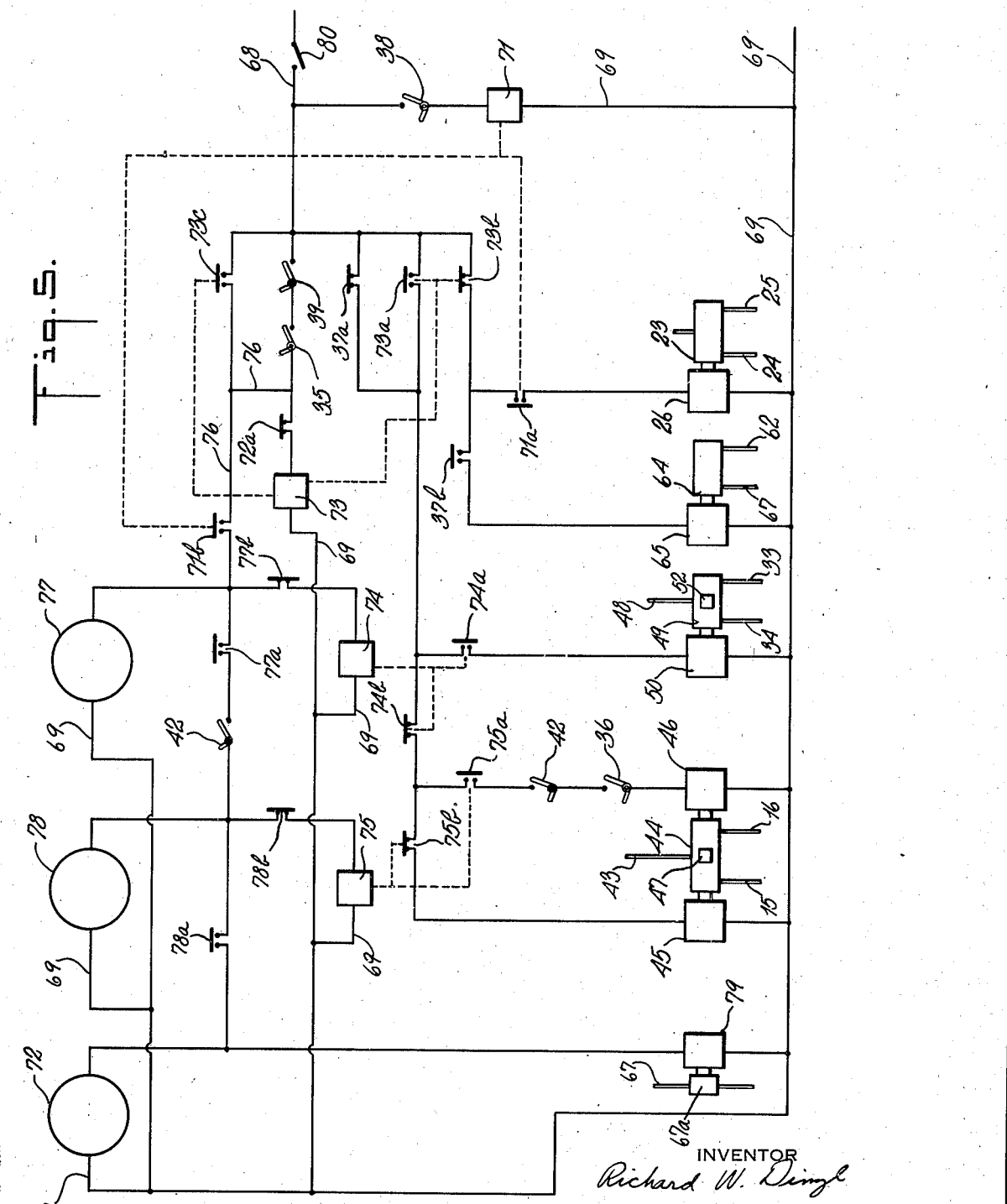
Fig. 5 is a wiring diagram.

The operation of the ram 9 is effected by means of the hydraulic system diagrammatically illustrated in Fig. 4 under the control of the electric system schematically illustrated in Fig. 5. The pump 18 has its outlet connected through a conduit 43 to the inlet of a tandem open-center four-way valve 44 equipped with operating solenoids 45 and 46 and having an outlet 47 communicating with the interior of the tank 17. The outlet of the pump 18 also communicates through the conduit 48 with the inlet of a four-way valve 49 equipped with an operating solenoid 50 and resetting spring 51 and having an outlet 52 communicating with the interior of the tank 17.

One port 53 of the four-way valve 44 communicates with the conduit 15 leading to the upper end of the cylinder 14 through a prefill valve 55 while another port 54 communicates with the conduit 16 leading to the lower end of the cylinder 14. The prefill valve comprises a cylindrical housing having a bore 56 through it of two different diameters. The top end of the prefill valve 55 is connected to the conduit 15 while the other end of the valve engages the top of the cylinder 14 in which is provided a passage 57 leading to the interior of the cylinder, the passage 57 communicating with but being of smaller cross section than the lower end of the bore 56. In the bore 56 is arranged a two-diameter piston 58 having a central passageway 59 of less cross-section than the passage 57. One or more passageways 60 lead from the lower portion of the bore 56 into the tank. When the piston 58 is depressed, the port 57 is partially closed and the cylinder 14 is in communication only with the conduit 15 through the passageway 59. When the piston 58 is elevated, the port 57 is fully open and the cylinder 14 is additionally in communication with the tank 17 through the passageway 60. A conduit 61 leads from the conduit 16 to the lower end of the larger diameter portion of the bore 56.

One port of the valve 49 communicates with the conduit 33 leading to one end of the cylinder 31 while the other port communicates with the conduit 34 leading to the other end of the cylinder. A conduit 62 leads from the conduit 16 through a needle valve 63 to the inlet of a valve 64 equipped with an operating solenoid 65 and resetting spring 66 and an outlet communicating with the tank 17.

The valve 44 is of such design that with both solenoids 45 and 46 de-energized, both ports 53 and 54 are closed to prevent flow through either conduit 15 or 16 to or from said valve and oil passing through the conduit 43 to the valve 44 is all returned to the tank through the outlet 47; with the solenoid 45 only energized, oil flows through the conduit 16 to the cylinder 14 and the pressure in the conduit 16 is applied to the larger section of the piston 58 through the conduit 15 into the tank by way of the outlet 47; and with solenoid 46 only energized, oil flows through the conduit 15 to the cylinder 14 and flows from the cylinder 14 through the conduit 16 to the tank by way of the outlet 47 and the pressure in the conduit 16 is applied to the larger section of the piston 58 through the conduit 61.

The arrangement of the valve 49 is such that with the solenoid 50 de-energized, the spring 51 maintains the valve in a position in which oil flows through the conduit 34 to the cylinder 31 and flows from the cylinder 31 through the conduit 33 to the tank through the outlet 52. Energization of the solenoid 50 operates the valve 49 against the action of the spring 51 into a position in which oil flows through the conduit 33 to the cylinder 31 and flows from the cylinder 31 through the conduit 34 to the tank by way of the outlet 52. The arrangement of the valve 64 is such that when the solenoid 65 is de-energized, the spring 66 holds the valve in a position in which communication is interrupted between the conduit 62 and the tank 17 but when the solenoid 65 is energized, the valve is operated to establish communication between the conduit 62 and the tank 17.

Movement of the slide 19 from the position shown in Fig. 3 into the path of the ram 9 is accomplished by energization of the solenoid 26 to cause compressed air to flow into the right end of the cylinder 22. Upon de-energization of the solenoid 26, the valve 23 is returned by the spring 25 into position to open the right end of the cylinder 22 to atmosphere. Upon energization of the solenoid 50, the valve 49 is operated to direct oil flow to and from the cylinder 31 to cause movement of the feeder slide 30 into the path of the ram 9 and concomitant return of the feeder slide 19 to its Fig. 3 position. De-energization of the solenoid 50 results in operation of the valve 49 to direct oil flow to and from the cylinder 31 to cause movement of the feeder slide 30 out of the path of the ram 9. Upon energization of the solenoid 45 only, the ram 9 is lifted and held lifted until the solenoid is de-energized. Upon energization of the solenoid 46 only the ram is moved downwardly and held down until after de-energization of the solenoid 46. Energization of the solenoid 65 results in operation of the valve 64 to by-pass oil from the cylinder 14 around the valve 44 through the valves 63 and 64 to the tank 17.

Downward movement of the ram 9 for engagement of the projections 11 with the feelers 27 is effected by energization of the solenoid 65 with both solenoids 45 and 46 de-energized and both ports 53 and 54 of the valve 44 blocked. Energization of the solenoid 65 causes operation of the valve 64 to put the conduit 62 in communication with the tank 17 thereby allowing liquid to flow through the needle valve 63. The weight of the ram exerts pressure on the oil in the cylinder 14 below the piston 13 tending to cause flow through the conduit 62 and the rate of flow is determined by the needle valve 63. This pressure is communicated through the conduit 61 to the under surface of the enlarged portion of the piston 58 thereby lifting it fully to open the port 57 and the passage 60 thus allowing oil from the tank 17 to flow into the cylinder 14 above the piston 13 thereby avoiding the creation of a vacuum in the upper portion of the cylinder. The ram thus descends under its own weight opposed by the back pressure in the liquid in the lower portion of the cylinder and very slight pressure is applied to the feelers 27.

A pipe 67 is connected to a source of compressed air (not shown). During opening of the die blocks after completion of a molding operation, a stream of air is supplied through the pipe for the purpose of stripping the finished articles from the projections 11 as well as blowing out the cavities 8.

Energization of the solenoids is effected by the electrical system of Fig. 5 in which 68 is one conductor and 69 is the other conductor of an alternating current supply. The conductor 68 is connected to the conductor 69 through the normally-open or self-opening limit switch 38 and the coil of a relay 71. The switch 38 is closed by the ram in its raised position. The conductor 68 is also connected through the normally-open or self-opening limit switch 39, the normally-open or self-opening limit switch 35, a pair of normally-closed or self-closing contacts 72a constituting part of a timer 72 later to be described and the coil of a relay 73. The switch 39 is released by the member for closing upon a predetermined downward movement of the ram and the switch 35 is closed by the slide 19 when it is under the ram 9. In addition, the conductor 68 is connected to the conductor 69 through a pair of normally closed or self-closing contacts 73b of the relay 73, a pair of normally-open or self-opening contacts 71a of the relay 71 and the solenoid 26. The conductor 68 is still further connected to the conductor 69 through the contacts 73b, the normally-open or self-opening contacts 37b of the limit switch 37 and the solenoid 66. The conductor 68 is additionally connected to the conductor 69 through the contacts 37a, a pair of normally-open or self-opening contacts 74a of a relay 74 (subsequently to be described) and the solenoid 50. The conductor 68 is also connected to the conductor 69 through said contacts 37a, a pair of normally-closed or self-closing contacts 74b of the relay 74, a pair of normally-open or self-opening contacts 75a of a relay 75 (subsequently to be described), the normally-open or self-opening limit switch 42, the normally-open or self-opening limit switch 36 and solenoid 46. In addition, the conductor 68 is connected through the normally-closed or self-closing contacts 37a of the limit switch 37, a pair of normally-closed or self-closing contacts 75b of a relay 75 (subsequently to be described) and the solenoid 45 to the conductor 69. A pair of normally-open or self-opening contacts 73a of the relay 73 are shunted around the contacts 37a.

A conductor 76 leads from between the switch 35 and contacts 72a through a pair of normally-open or self-opening contacts 71b of the relay 71, a pair of normally-open or self-opening contacts 77a controlled by a timer 77, the limit switch 42, a pair of normally-open or self-opening contacts 78a controlled by a timer 78 and a solenoid 79 for operating a valve (not shown) controlling flow of air through the pipe 67. A pair of normally-open or self-opening contacts 73c of the relay 73 are arranged in a shunt circuit around the switches 39 and 35. The timer 77 is connected to the conductor 76 between the contacts 71b and the contacts 77a and to the conductor 69. The relay 74 is connected to the conductor 76 through a pair of normally-closed or self-closing contacts 77b controlled by the timer 77 and to the conductor 69. The coil of the relay 75 is connected to the conductor 76 between the contacts 78a and switch 42 through a pair of normally-closed or self-closing contacts 78b controlled by the timer 78. The timer 78 is connected to the conductor 76 between the contacts 78a and the switch 42 and to the conductor 69. The timer 72 is connected to the conductor 76 between the contacts 78a and the solenoid 79, which actuates a valve 67a for controlling air flow through the pipe 67.

The timers 72, 77 and 78 are standard devices of the type known to the trade as synchronous motor-driven timers. Each timer operates only as long as current is supplied to it and after a predetermined time interval of operation, it reverses the normal relation of each pair of contacts controlled by it and retains them in the reversed relation for another predetermined time interval at the end of which the contacts are automatically restored to their original relation.

Assume that the machine has been inoperative for a period of time due to opening of the main switch 80 and that the ram 9 has drifted down to its lowermost position due to oil leakage from the cylinder 14. At such time both slides 19 and 30 are in their Fig. 3 position and the various switches and contacts are in the relation shown in Fig. 5 except that the switch 39 is closed due to the disengagement of the member 41 therefrom and the switches 36 and 42 are closed. Closing of the switch 80 causes current to flow through the contacts 37a and 74b to energize the solenoid 45 thereby causing upward movement of the ram and opening of the switch 39 and closing of the switch 38 at the top limit of the ram stroke. Current now flows through the relay 71 which is energized to close the contacts 71a and 71b. Current thereupon flows from the conductor 68 through the contacts 73b, contacts 71a and solenoid 26, energizing the latter to operate the valve 23 to conduct compressed air into the cylinder 22 thereby moving the piston 21 to the left and drawing the slide 19 leftward to locate the feelers 27 under the projections 11. Leftward movement of the slide 19 closes the switch 35 and at the same time opens the contacts 37a while closing the contacts 37b.

Current thereupon flows through the contacts 73b and 37b and the solenoid 66 to energize the latter and open the valve 64 to permit oil to bleed out of the cylinder 14 at a speed controlled by needle valve 63 from below the piston 13 which will descend under its own weight opposed by the back oil pressure. The piston 58 is lifted by pressure applied to it through the conduit 61 as above described to permit oil to flow from the tank into the cylinder 14. Descent of the ram 9 opens the limit switch 38 thereby de-energizing the relay 71 and opening the contacts 71a and the contacts 71b with concomitant de-energization of the solenoid 26 and return of the valve 25 to the position in which the cylinder 22 is open to atmosphere but the piston 21 and the slide 19 remain in actuated position.

If there is an obstruction on a projection 11 or in a recess 8, the ram is prevented from descending far enough for member 41 to release the switch 39 to closed condition and the machine stops with the ram in this position. If the ram descends far enough for the member 41 to release the switch 39 then current flows from the conductor 68 through the switch 39, the previously closed switch 35, the closed contacts 72a and the relay 73.

Energization of the relay 73 closes the contacts 73a and 73c and opens the contacts 73b, thereby de-energizing the solenoid 66. The valve 64 is thereupon returned to the position in which communication is interrupted between the conduit 62 and the tank 17. Current now flows from the conductor 68 through the contacts 73a, 74b and contacts 75b to the solenoid 45. Energization of the solenoid 45 sets the valve 44 in position to deliver oil through the conduit 16 to the bottom of the cylinder 14 and put the port 53 in communication with the outlet 46, thereby effecting elevation of the ram 9. The pressure in the conduit 16 is communicated through the conduit 61 to the space below the enlarged portion of the piston 58 to lift it and open the passage 60 thereby permitting flow of oil from the top of the cylinder 14 through the passages 57 and 60 into the tank 17. As the ram starts upward, the switch 39 is opened but current continues to flow through the coil of the relay 73 by way of the now-closed contacts 73c. At the top of the ram stroke, the switch 38 is again closed and the relay 71 energized to close contacts 71a and 71b but since the contacts 73b are now open, neither the solenoid 26 nor solenoid 66 is energized.

Current now flows through the contacts 73c and 71b to the timer 77 and through the contacts 77b and coil of relay 74 thereby starting the timer 77 and energizing the relay 74 to close the contacts 74a and open the contacts 74b. Upon closure of the contacts 74a, current flows from the conductor 68 through the now-closed contacts 73a and contacts 74a to the solenoid 50, energization of which operates the valve 49 to reverse the oil connection to the cylinder 31 and cause movement of the slide 30 to the right to a position below the ram 9 with concomitant return of the feeler slide 19 by the feed slide 30 to the position shown in Fig. 3. Rightward movement of the feeler slide releases the limit switch 35 to open condition and also effects closing of the contacts 37a and opening of the contacts 37b. Rightward movement of the feeler slide 30 releases the switch 42 to open condition. Opening of the switch 42 and opening of the contacts 37b prevents energization of the solenoids 46 and 66. When the timer 77 times out, it closes the contacts 77a and opens the contacts 77b thereby de-energizing the relay 74 with consequent opening of the contacts 74a and closing of the contacts 74b and de-energization of the solenoid 50. The valve 49 is thereupon reversed in position to cause oil to flow to the cylinder 31 to cause return of the feed slide 30 to the position shown in Fig. 3 and close limit switch 42.

Closure of the switch 42 causes flow of current from the conductor 68 through conductor 76 to the timer 78 starting it and through the contacts 78b and the coil of the relay 75, energization of which opens the contacts 75b and closes the contacts 75a. Thereupon, current flows from the conductor 68 through the contacts 37b, contacts 75a, limit switch 42, limit switch 36 and the solenoid 46, energization of which operates the valve 44 to cause flow of oil through the conduit 15 to the top of the cylinder 14 and put the port 54 in communication with outlet 47 thereby causing downward movement of the ram with concomitant opening of the switch 38 and closing of the switch 39. Because the switch 35 is now open, closing of the switch 39 has no present effect. Upon the port 54 being put in communication with the outlet 47, the weight of the ram causes downward movement thereof, together with flow of oil from the bottom of the cylinder 14 through the conduit 16 to the tank 17 at a higher rate than oil is supplied by the pump 18 to the top of the cylinder 14 through the conduit 15 until the ram reaches its working stroke. The pressure of the oil in the conduit 16 is communicated through the tank 17 to the under face of the larger portion of the valve 58 to lift it and open the passage 60, thereby permitting flow of oil from the tank into the cylinder or keep full that portion of the cylinder above the ram 13. When the ram reaches its working stroke, further downward movement is effected by the pressure of the oil in the cylinder above the ram and the rate of flow through the conduit 16 drops with consequent drop in the pressure supplied to the prefill valve through the conduit 61 resulting in descent of the piston 58 into position to close the passage 60 and limit flow of oil to the cylinder 14 to that supplied from the pump 18 through the conduit 15.

After the timer 78 times out it closes the contacts 78a and opens the contacts 78b thereby de-energizing the relay 75 to close the contacts 75b and open the contacts 75a. Thereupon current flows from the conductor 68 through the contacts 37a and 74b and 75b to the solenoid 45 whereupon the valve 44 is set to cause the ram to be lifted. Closure of the contacts 78a also causes current flow through the timer 72 and the solenoid 79 to direct a stream of air through the pipe 67 against the projections 11 to remove the molded article therefrom during upward movement of the ram. When the blower timer 72 times out, the contacts 72a are opened, thus breaking the circuit through the relay 73 whereupon the contacts 73a and 73c open and the contacts 73b close, thereby again energizing the solenoid 26 to condition the machine for another molding cycle. The timing out of the blower timer 72 allows all the timers to reset.

I claim:

1. In a molding machine, a stationary base, a ram vertically movable toward and away from said base, hydraulic means for operating said ram, a slide movable into and out of the path of said ram, feeler means supported by said slide for reciprocation parallel to the path of said ram, said feeler means being biased away from said base and engageable by said ram for movement thereof toward said base when said slide is in the path of said ram, and control mechanism for said hydraulic means, said control mechanism including means responsive to movement of said ram to its uppermost position to render said hydraulic means inoperative and release said ram for movement toward said base at controlled velocity under the influence of gravity and means responsive to movement of the ram a predetermined distance toward the base for rendering said hydraulic means again operative.

2. In a molding machine, a stationary base, a ram vertically movable toward and away from said base, hydraulic means for operating said ram, a slide movable into and out of the path of said ram, a rod supported by said slide for reciprocation parallel to the path of said ram, said rod being biased away from said base and engageable by said ram to move it toward said base when said slide is in the path of said ram, and mechanism for controlling said hydraulic means, said mechanism including means responsive to movement of said ram to its uppermost position to render said hydraulic means inoperative and release said ram for movement toward said base at controlled velocity under the influence of gravity and means responsive to movement of said ram a predetermined distance toward said base to render said hydraulic means again operative.

3. In a molding machine, a stationary base, a ram movable toward and away from said base, a vertical hydraulic motor operatively connected to said ram, a source of fluid under pressure, valve means for controlling fluid flow from said source to said motor and from said motor and also having provision for preventing fluid flow into said valve means from said motor, a bleed for withdrawing fluid from the bottom end of said motor, a valve normally closing said bleed, a slide movable into and out of the path of said ram, means responsive to movement of the slide into the path of the ram to open said bleed valve and condition said valve means for preventing fluid flow thereinto, means responsive to a predetermined extent of movement of said ram to effect closing of said bleed valve and conditioning of said valve means to permit fluid flow thereinto, and means responsive to the pressure in the lower portion of said motor for admitting fluid to the top of said motor.

4. In a molding machine, a vertical cylinder, a piston reciprocable therein, a ram connected to said piston, a tank communicating with the top of said cylinder, a conduit leading from the bottom of said cylinder, a source of fluid under pressure, valve means for controlling fluid flow from said source to said cylinder and from said cylinder to said tank and having provision for preventing flow into said valve means from said cylinder, a bleed for withdrawing fluid from the bottom end of said cylinder, a normally closed valve in said bleed, a slide movable into the path of said ram to open said bleed valve and condition said valve means to prevent fluid flow thereinto, means responsive to a predetermined extent of downward movement of said ram to effect closing of said bleed valve and conditioning of said valve means to permit fluid flow thereinto, and a valve responsive to the pressure in the lower portion of said cylinder for controlling flow from said tank into said cylinder.

5. In a molding machine, a stationary base a ram vertically movable toward and away from said base, a vertical cylinder, a piston reciprocable in said cylinder and connected to said ram, a source of fluid under pressure, valve means for controlling fluid flow from said source to said cylinder and from said cylinder and having provision for preventing flow into said valve means from said cylinder, a valve-controlled vent from the lower end of said cylinder, a slide movable into and out of the path of the ram, feeler means supported by said slide for reciprocation parallel to the path of said ram, said feeler means being biased away from said base and engageable by said ram for movement thereof toward said base when said slide is in the path of said ram, control means for said valve means, means for opening said vent with said slide under said ram and setting said valve means in position to prevent flow therethrough from said cylinder, and means responsive to the movement of said ram a predetermined distance toward said base for resetting said valve means to supply fluid again to said cylinder.

6. In a molding machine according to claim 5, additional means responsive to pressure in the lower portion of said cylinder for admitting fluid into the top of said cylinder.

7. In a molding machine, a ram vertically movable between a first position and a second position, a vertical cylinder, a piston reciprocable in said cylinder and connected to said ram, a source of fluid under pressure, valve means for controlling fluid flow from said source to said cylinder and from said cylinder and having provision for preventing flow into said valve means from said cylinder, a valve-controlled vent from the lower end of said cylinder, a slide movable into and out of the path of the ram, feeler means supported by said slide for reciprocation parallel to the path of said ram, said feeler means being biased toward said ram and engageable by said ram for movement thereby when said slide is in the path of said ram, means responsive to movement of said ram into its first position for moving said slide into the path of said ram, means responsive to such movement of said slide for opening said vent and conditioning said valve means to prevent flow thereinto from said cylinder, means responsive to movement of said ram a predetermined distance toward its second position for resetting said valve means to supply fluid again to said cylinder, and additional means responsive to the return of said ram to its first position for retracting said slide.

8. In a molding machine according to claim 7, means responsive to pressure in the lower portion of said cylinder for admitting fluid into the top of said cylinder.

9. In a molding machine, a ram vertically movable between a first position and a second position, a vertical hydraulic motor operatively connected to said ram, a source of fluid under pressure, valve means for controlling fluid flow from said source to said motor and from said motor and also having provision for preventing fluid flow into said valve means from said motor, a slide movable into and out of the path of said ram, feeler means supported by said slide for reciprocation parallel to the path of said ram, said feeler means being biased toward said ram and engageable by said ram for movement thereby when said slide is in the path of said ram, means responsive to movement of said ram into its first position for moving said slide into the path of said ram, and means responsive to movement of said slide into such position to release fluid from the lower end of said motor and set said valve means to prevent flow thereinto from said motor.

10. In a molding machine according to claim 9, additional means responsive to pressure in the lower portion of said motor for admitting fluid to the top portion thereof.

11. In a molding machine, a vertical cylinder, a piston reciprocable therein, a ram connected to said piston, a tank communicating with the top of said cylinder, a conduit leading from the bottom of said cylinder, a first valve controlling flow through said conduit, a second valve responsive to pressure in the lower portion of said cylinder for controlling communication between said tank and the top of said cylinder, a source of fluid under pressure, valve means for controlling fluid flow from said source to said cylinder and from said cylinder to said tank and having provision for preventing flow into said valve means from said cylinder, a bleed for withdrawing fluid from the bottom end of said cylinder, a normally closed valve in said bleed, a slide movable into and out of the path of the ram, feeler means supported by said slide for reciprocation parallel to the path of said ram, said feeler means being biased toward said ram, and engageable by said ram for movement thereby when said slide is in the path of said ram, means responsive to movement of said ram into its upper position for moving said slide into the path of said ram, means responsive to such movement of said slide for opening said bleed valve and conditioning said valve means to prevent flow thereinto from said cylinder, means responsive to the movement of said ram more than a predetermined downward distance to effect closing of said bleed valve and conditioning of said valve means to permit flow thereinto from said cylinder, and additional means responsive to the return of said ram to its first position for retracting said slide.

12. In a molding machine according to claim 11, additional means responsive to pressure in the lower portion of said cylinder for admitting fluid into the top of said cylinder.

13. In a molding machine, a stationary base, a ram vertically movable toward and away from said base, a vertical hydraulic motor connected to said ram to effect reciprocation thereof, a hydraulic fluid reservoir, a pump for withdrawing fluid from said reservoir, connections for flowing hydraulic fluid to and from said motor including a four-way valve operative to selectively connect the ends of said hydraulic motor to said pump and reservoir or to interrupt communication between said motor and both said pump and reservoir, a self-closing vent from the lower end of said motor, a slide movable into and out of the path of said ram, feeler means supported by said slide for reciprocation parallel to the path of said ram, said feeler means being biased away from said base and engageable by said ram for movement thereby toward said base when said slide is in the path of said ram, means responsive to movement of said ram into its uppermost position to reciprocate said slide into the path of said ram and set said four-way valve to interrupt communication between said motor and both said pump and said reservoir, means operated by movement of said slide into the path of said ram to open said vent, means responsive to downward movement of the ram over a predetermined distance to set said valve to supply hydraulic fluid to the lower end of said motor and effect closing of said vent.

14. In a molding machine, a stationary base, a ram vertically movable toward and away from said base, a vertical hydraulic motor connected to said ram to effect reciprocation thereof, a hydraulic fluid reservoir, a pump for withdrawing fluid from said reservoir, connections for flowing hydraulic fluid to and from said motor including a four-way valve operative to selectively connect the ends of said hydraulic motor to said pump and reservoir or to interrupt communication between said motor and both said pump and reservoir, a self-closing vent from the lower end of said motor, a slide movable into and out of the path of said ram, a rod supported by said slide for reciprocation parallel to the path of said ram, said rod being biased away from said base and engageable by said ram for movement thereby toward said base when said slide is in the path of said ram, means responsive to movement of said ram into its uppermost position to reciprocate said slide into the path of said ram and set said four-way valve to interrupt communication between said motor and both said pump and said reservoir, means operated by movement of said slide into the path of said ram to open said vent, means responsive to downward movement of the ram over a predetermined distance to set said valve to supply hydraulic fluid to the lower end of said motor and effect closing of said vent.

15. In a molding machine according to claim 13, means responsive to the pressure at the lower end of said motor for admitting hydraulic fluid at the top end of said motor.

16. In a molding machine according to claim 14, means responsive to the pressure at the lower end of said motor for admitting hydraulic fluid at the top end of said motor.

RICHARD W. DINZL.

REFERENCES CITED

The following references are of record in the file of this patent:

UNITED STATES PATENTS

| Number | Name | Date |
|---|---|---|
| 1,613,563 | Grattan | Jan. 4, 1927 |
| 1,870,500 | Ernst | Aug. 9, 1932 |
| 1,884,060 | MacMillin | Oct. 25, 1932 |
| 2,148,543 | Dinzl | Feb. 28, 1939 |
| 2,371,195 | Strauss | Mar. 13, 1945 |
| 2,257,732 | Clark | Oct. 7, 1941 |
| 2,276,016 | Brantly | Mar. 10, 1942 |

Certificate of Correction

Patent No. 2,444,339.

June 29, 1948.

RICHARD W. DINZL

It is hereby certified that error appears in the printed specification of the above numbered patent requiring correction as follows: Column 4, line 71, after the word "conduit" insert *61 and flows from the cylinder 14 through the conduit*; and that the said Letters Patent should be read with this correction therein that the same may conform to the record of the case in the Patent Office.

Signed and sealed this 2nd day of November, A. D. 1948.

[SEAL]

THOMAS F. MURPHY,
*Assistant Commissioner of Patents.*